US012143020B2

(12) United States Patent
Li et al.

(10) Patent No.: US 12,143,020 B2
(45) Date of Patent: *Nov. 12, 2024

(54) POWER APPARATUS APPLIED IN SOLID STATE TRANSFORMER STRUCTURE AND THREE-PHASE POWER SYSTEM HAVING THE SAME

(71) Applicant: DELTA ELECTRONICS, INC., Taoyuan (TW)

(72) Inventors: Sheng-Hua Li, Taoyuan (TW); Wen-Lung Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,731

(22) Filed: Sep. 21, 2023

(65) Prior Publication Data
US 2024/0014740 A1 Jan. 11, 2024

Related U.S. Application Data

(63) Continuation of application No. 17/972,290, filed on Oct. 24, 2022, now Pat. No. 11,811,327, which is a
(Continued)

(30) Foreign Application Priority Data

Aug. 7, 2019 (CN) .......................... 201910725524.X

(51) Int. Cl.
*H02M 1/00* (2007.01)
*H02J 3/38* (2006.01)
(Continued)

(52) U.S. Cl.
CPC ............. *H02M 3/24* (2013.01); *H02M 1/009* (2021.05); *H02J 3/381* (2013.01); *H02J 7/007* (2013.01);
(Continued)

(58) Field of Classification Search
CPC ........................... H02M 1/007; H02J 2300/24
See application file for complete search history.

(56) References Cited

U.S. PATENT DOCUMENTS 5,612,581 A * 3/1997 Kageyama .............. H02J 1/102
307/64
5,982,645 A 11/1999 Levran et al.
(Continued)

FOREIGN PATENT DOCUMENTS

| CN | 202268732 U | 6/2012 |
| CN | 106602565 A | 4/2017 |

(Continued)

OTHER PUBLICATIONS

English translation of CN-106602565, "A Solid-state Transformer-based Electric Automobile Charging Station Power Supply System," Chen Yu, Apr. 2017, 16 pages.
(Continued)

*Primary Examiner* — Sisay G Tiku
(74) *Attorney, Agent, or Firm* — MUNCY, GEISSLER, OLDS & LOWE, P.C.

(57) ABSTRACT

A power apparatus applied in a solid state transformer structure includes an AC-to-DC conversion unit, a first DC bus, and a plurality of bi-directional DC conversion units. First sides of the bi-directional DC conversion units are coupled to the first DC bus. Second sides of the bi-directional DC conversion units are configured to form at least one second DC bus, and the number of the at least one second DC bus is a bus number. The bi-directional DC conversion units receive a bus voltage of the first DC bus and convert the bus voltage into at least one DC voltage, or the bi-directional DC conversion units receive at least one external DC voltage and convert the at least one external DC voltage into the bus voltage.

17 Claims, 10 Drawing Sheets

Related U.S. Application Data continuation of application No. 16/863,318, filed on Apr. 30, 2020, now Pat. No. 11,515,795.

(51) Int. Cl.
| | | |
|---|---|---|
| *H02J 7/00* | (2006.01) | |
| *H02M 3/158* | (2006.01) | |
| *H02M 3/24* | (2006.01) | |
| *H02M 3/335* | (2006.01) | |
| *H02M 3/28* | (2006.01) | |

(52) U.S. Cl.
CPC ....... *H02J 2207/20* (2020.01); *H02J 2300/24* (2020.01); *H02M 1/007* (2021.05); *H02M 3/285* (2013.01)

(56) References Cited

U.S. PATENT DOCUMENTS

| | | |
|---|---|---|
| 9,537,406 B1 | 1/2017 | Lin |
| 10,811,983 B2 | 10/2020 | Lu et al. |
| 10,933,764 B2 | 3/2021 | Heyne et al. |
| 2002/0071292 A1* | 6/2002 | Aihara .................... H02J 9/061 363/20 |
| 2004/0130292 A1 | 7/2004 | Buchanan et al. |
| 2004/0189251 A1* | 9/2004 | Kutkut ...................... H02J 7/02 320/128 |
| 2013/0197704 A1* | 8/2013 | Pan ......................... H02J 3/381 363/35 |
| 2014/0091630 A1* | 4/2014 | Kim .......................... H02J 3/46 307/82 |
| 2015/0070939 A1 | 3/2015 | Gupta et al. |
| 2016/0016479 A1 | 1/2016 | Khaligh et al. |
| 2018/0162229 A1 | 6/2018 | Götz et al. |
| 2018/0187653 A1 | 7/2018 | Kolhatkar et al. |
| 2018/0262117 A1 | 9/2018 | Lu et al. |
| 2018/0278168 A1* | 9/2018 | Brown .................... H02P 27/06 |
| 2018/0339595 A1 | 11/2018 | Chang |
| 2019/0157979 A1 | 5/2019 | Higaki et al. |
| 2020/0001730 A1 | 1/2020 | Gohla-Neudecker et al. |
| 2020/0006970 A1 | 1/2020 | Chen et al. |
| 2020/0212816 A1* | 7/2020 | Sun ........................ H02J 7/0018 |
| 2021/0013812 A1 | 1/2021 | Huang et al. |
| 2021/0044210 A1 | 2/2021 | Huang et al. |
| 2021/0061114 A1* | 3/2021 | Sun ........................... H02J 7/02 |

FOREIGN PATENT DOCUMENTS

| | | | | |
|---|---|---|---|---|
| CN | 106712024 A | | 5/2017 | |
| CN | 206658155 U | | 11/2017 | |
| CN | 108599246 A | | 9/2018 | |
| CN | 109428338 A | | 3/2019 | |
| CN | 109617433 A | | 4/2019 | |
| CN | 111384718 A | | 7/2020 | |
| CN | 112918288 A | * | 6/2021 | .............. B60L 53/14 |
| CN | 113580963 A | * | 11/2021 | |
| CN | 218352181 U | * | 1/2023 | |
| CN | 220410340 U | * | 1/2024 | |
| WO | WO-2013/010805 A2 | | 1/2013 | |
| WO | WO-2013/086238 A1 | | 6/2013 | |
| WO | WO-2013/159821 A1 | | 10/2013 | |
| WO | WO-2014/009369 A2 | | 1/2014 | |

OTHER PUBLICATIONS

Office Action dated Sep. 3, 2020 issued in corresponding Taiwan Patent Application No. 108127990, 9 pages.
Office Action dated Aug. 3, 2021 issued in corresponding China Application No. 201910725524.X, 9 pages.

* cited by examiner

POWER APPARATUS APPLIED IN SOLID STATE TRANSFORMER STRUCTURE AND THREE-PHASE POWER SYSTEM HAVING THE SAME

CROSS-REFERENCE TO RELATED APPLICATIONS

This application is a continuing application of U.S. patent application Ser. No. 17/972,290 filed on Oct. 24, 2022, which is a continuing application of U.S. patent application Ser. No. 16/863,318 filed on Apr. 30, 2020, now issued on Nov. 29, 2022 as U.S. Pat. No. 11,515,795B2, which claims priority to CN201910725524.X filed Aug. 7, 2019. The entire disclosures of the above applications are all incorporated herein by reference.

BACKGROUND

Technical Field

The present disclosure relates to a power apparatus and a three-phase power system, and more particularly to a power apparatus applied in a solid state transformer structure and a three-phase power system having the same.

Description of Related Art

The statements in this section merely provide background information related to the present disclosure and do not necessarily constitute prior art.

With the development of power electronic components, distributed energy resources, and smart grids, solid state transformers (SST) have become an increasingly hot research topic. Solid state transformers have multi-function and high-performance features, including integration of microgrid, correction of power factor, compensation of reactive power, isolation of fault current, adjustment of output voltage, and so on.

Regarding the technical field of DC electric vehicle (EV) charging station design, how to keep a DC EV charging station electrically isolated from the AC grid, that is, the DC side must be kept isolated from other power lines (including the grounding), and how to design the electrical isolation directly at the DC charging station are relatively difficult both in terms of circuit design and cost considerations. Therefore, there has also been relatively little research and development on the aforementioned design topics. Furthermore, to design a power supply system with different output voltages to meet various requirements of different EV charging specifications is also a topic with great concern in this technical field.

Therefore, how to design a power apparatus and a three-phase power supply system applied to the solid state transformer structure to solve the aforementioned technical problems is an important subject studied by the inventors of the present disclosure.

SUMMARY

An object of the present disclosure is to provide a power apparatus applied in a solid state transformer (SST) structure to solve the above-mentioned problems.

In order to achieve the above-mentioned object, the power apparatus applied in the SST structure include an AC-to-DC conversion unit, a first DC bus, and a plurality of bi-directional DC conversion units. The AC-to-DC conversion unit has a first side and a second side, wherein the first side of the AC-to-DC conversion unit is coupled to an AC power source. The first DC bus is coupled to the second side of the AC-to-DC conversion unit, and has a bus voltage. Each of the bi-directional DC conversion units has a first side and a second side, and is a single-stage conversion structure or two-stage conversion structure, wherein the first sides of the bi-directional DC conversion units are coupled to the first DC bus, the second side of the bi-directional DC conversion units are configured to form at least one second DC bus, and the number of the at least one second DC bus is a bus number. The bi-directional DC conversion units receive the bus voltage of the first DC bus and convert the bus voltage into at least one DC voltage whose number is same as the bus number, or the bi-directional DC conversion units receive at least one external DC voltage whose number is same as the bus number and convert the at least one external DC voltage into the bus voltage of the first DC bus.

Accordingly, the power apparatus applied in the SST structure can provide different voltages and meet isolation requirements.

Another object of the present disclosure is to provide a power system applied in a solid state transformer (SST) structure to solve the above-mentioned problems.

In order to achieve the above-mentioned object, the power system is configured to be coupled to a three-phase AC power source, wherein the power system includes a plurality of power apparatuses coupled to any one phase of the three-phase AC power source. The AC-to-DC conversion units are coupled in series, and the second sides of the bi-directional DC conversion units are coupled in parallel.

Accordingly, the three-phase power system applied in the SST structure can provide different voltages, meet isolation requirements, and achieve voltage equalization and power balance.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWING

The present disclosure can be more fully understood by reading the following detailed description of the embodiment, with reference made to the accompanying drawing as follows.

DETAILED DESCRIPTION

Figure 1A:
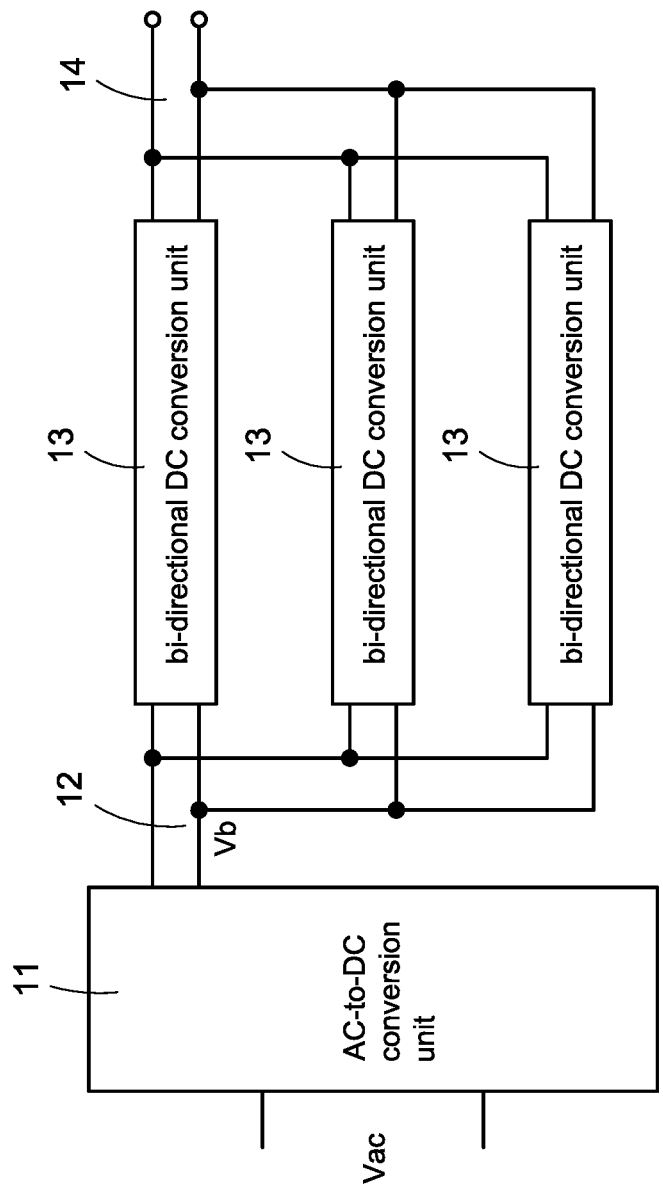
FIG. 1A is a circuit block diagram of a power apparatus applied in a solid state transformer (SST) structure according to a first embodiment of the present disclosure.

Reference will now be made to the drawing figures to describe the present disclosure in detail. It shall be understood that the drawing figures and exemplified embodiments of present disclosure are not limited to the details thereof.

Figure 1B:
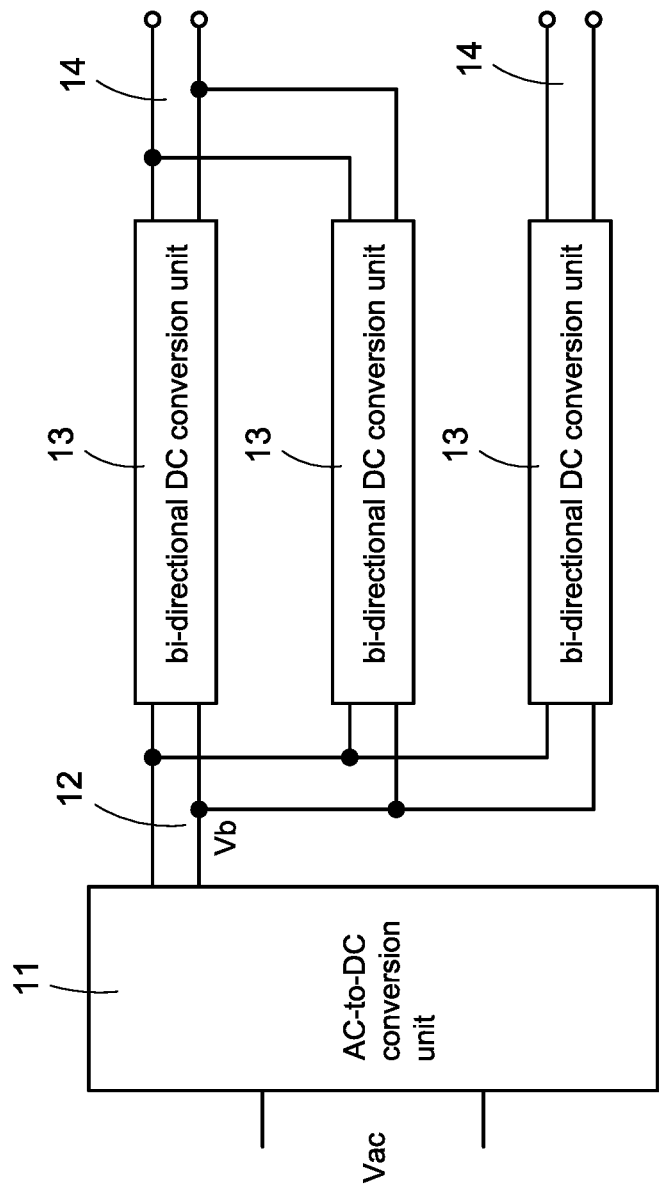
FIG. 1B is a circuit block diagram of the power apparatus applied in the SST structure according to a second embodiment of the present disclosure.
Figure 1C:
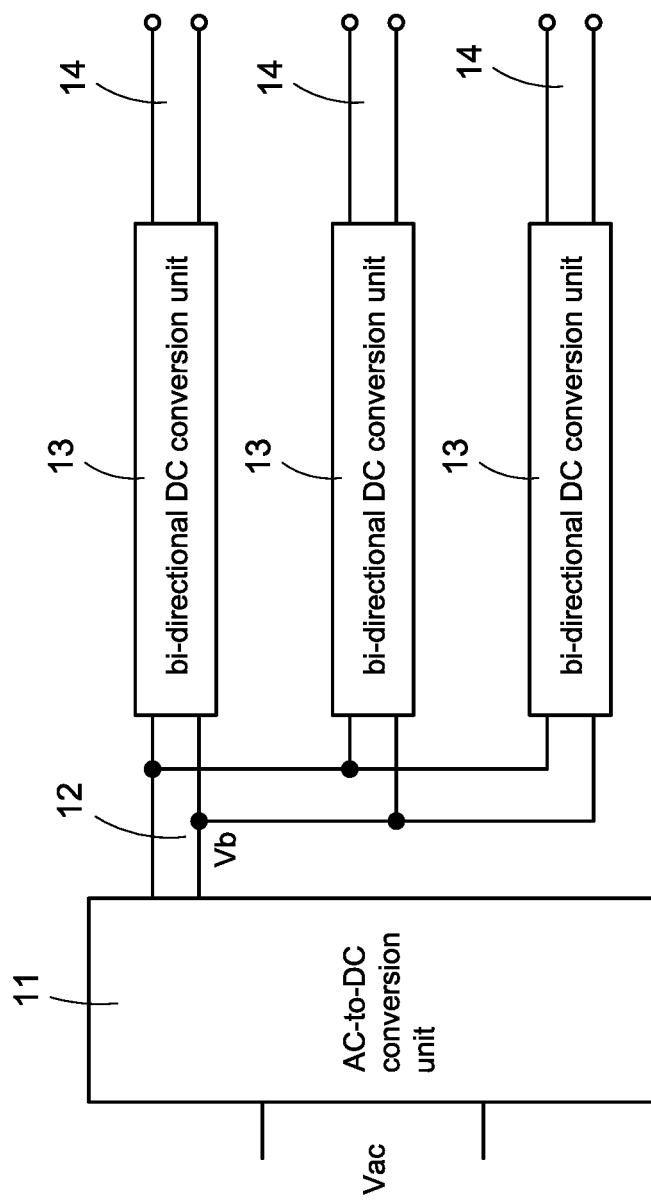
FIG. 1C is a circuit block diagram of the power apparatus applied in the SST structure according to a third embodiment of the present disclosure.

Please refer to FIG. 1A to FIG. 1C, which show circuit block diagrams of a power apparatus applied in a solid state transformer (SST) structure according to a first embodiment, a second embodiment, and a third embodiment of the present disclosure, respectively. The power apparatus includes an AC-to-DC conversion unit 11, a first DC bus 12, and a plurality of bi-directional DC conversion units 13.

The AC-to-DC conversion unit 11 has a first side and a second side. The first side of the AC-to-DC conversion unit 11 is coupled to an AC power source Vac, wherein the AC power source Vac may be a power grid. The AC-to-DC conversion unit 11 converts the AC power source Vac into a DC power source (hereinafter referred to as "bus voltage"). The first DC bus 12 is coupled to the second side of the AC-to-DC conversion unit 11 and has the bus voltage Vb, that is, the bus voltage Vb is a DC voltage on the first DC bus 12.

Each of the bi-directional DC conversion units 13 has a first side and a second side, and each of the bi-directional DC conversion units 13 may be a single-stage conversion structure or a two-stage conversion structure, detailed description as follows. As shown in FIG. 1A to FIG. 1C, the first sides of the bi-directional DC conversion units 13 are coupled to the first DC bus 12, that is, coupled to the second side of the AC-to-DC conversion unit 11.

The second sides of the bi-directional DC conversion units 13 are configured to form at least one second DC bus 14, and the number of the at least one second DC bus 14 is a bus number. As shown in FIG. 1A to FIG. 1C, each of the power apparatuses has three isolated DC power sources, however, this is not a limitation of the present disclosure. For convenience, hereinafter FIG. 1A to FIG. 1C will be taken as examples. In FIG. 1A, since the three second sides of the three bi-directional DC conversion units 13 are coupled in parallel to each other, the three second sides of the three bi-directional DC conversion units 13 are configured to form one second DC bus 14 (the bus number is equal to 1).

In FIG. 1B, since the second side of the first bi-directional DC conversion unit 13 and the second side of the second bi-directional DC conversion unit 13 are coupled in parallel to each other, and the second side of the third bi-directional DC conversion unit 13 is alone configured, the three second sides of the three bi-directional DC conversion units 13 are configured to form two second DC buses 14 (the bus number is equal to 2). In addition, in FIG. 1B, the two in-parallel second sides are not limited to the second side of the first bi-directional DC conversion unit 13 and the second side of the second bi-directional DC conversion unit 13. In other words, as long as two second sides of any two bi-directional DC conversion units 13 are coupled in parallel to each other, and the remaining one second side is alone configured to form two second DC buses 14, that should be included in the scope of the present disclosure.

In FIG. 1C, since the three second sides of the three bi-directional DC conversion units 13 are alone configured, the three second sides of the three bi-directional DC conversion units 13 are configured to form three second DC buses 14 (the bus number is equal to 3).

In addition, if the number of the bi-directional DC conversion units 13 is four, i.e., the bus number is equal to 4, the number of the second DC buses 14 configured by the four second sides of the four bi-directional DC conversion units 13 can be from 1 to 4. The four second sides of the four bi-directional DC conversion units 13 are coupled in parallel to each other to form one second DC bus 14 (the bus number is equal to 1). The four second sides of the four bi-directional DC conversion units 13 are alone configured to form two second DC buses 14 (the bus number is equal to 2). If two second sides are coupled in parallel to each other and the remaining two second sides are coupled in parallel to each other, or three second sides are coupled in parallel to each other and the remaining one second side is alone configured, two second DC buses 14 (the bus number is equal to 2) are formed. If two second sides are coupled in parallel to each other and the remaining two second sides are alone configured, three second DC buses 14 (the bus number is equal to 3) are formed. Therefore, for the number of the bi-directional DC conversion units 13 of the N, the number of the second DC buses 14 configured on the second sides may be 1 to N, and the configuration thereof is as described above, and details are not described herein again.

Figure 2A:
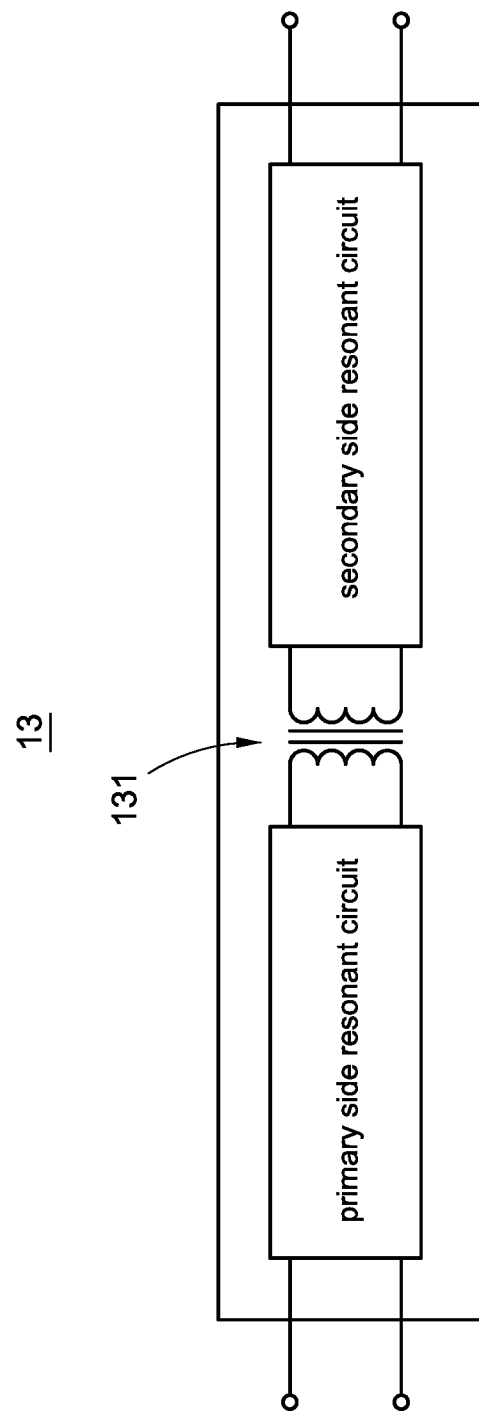
FIG. 2A is a circuit block diagram of a bi-directional DC conversion unit of the power apparatus according to a first embodiment of the present disclosure.
Figure 2B:
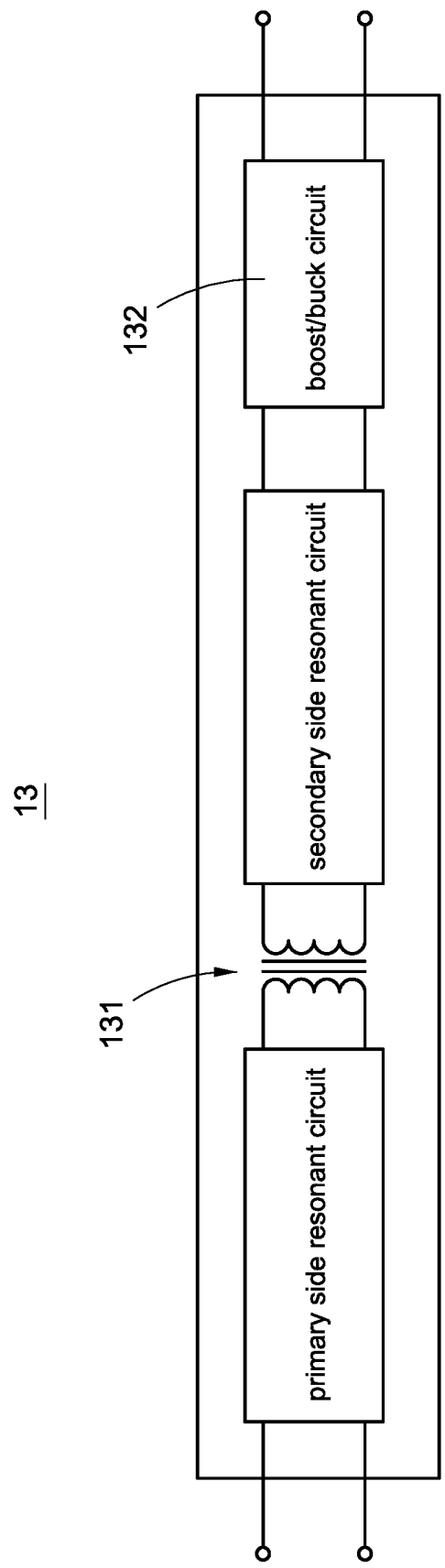
FIG. 2B is a circuit block diagram of the bi-directional DC conversion unit of the power apparatus according to a second embodiment of the present disclosure.

Please refer to FIG. 2A and FIG. 2B, which show circuit block diagrams of the bi-directional DC conversion unit of the power apparatus according to a first embodiment and a second embodiment of the present disclosure, respectively. As mentioned above, each of the bi-directional DC conversion units 13 is a single-stage conversion structure (shown in FIG. 2A) or two-stage conversion structure (shown in FIG. 2B). As shown in FIG. 2A, the bi-directional DC conversion unit 13 with the single-stage conversion structure only has a first stage conversion circuit 131, and the first stage conversion circuit 131 has an isolated transformer, a primary side resonant circuit, and a secondary side resonant circuit. The primary side resonant circuit is coupled to a primary side of the isolated transformer and the secondary side resonant circuit is coupled to a secondary side of the isolated transformer. In this embodiment, the primary side resonant circuit and the secondary side resonant circuit may be a symmetric CLLC resonant circuit, and therefore the first stage conversion circuit 131 is a CLLC resonant DC power conversion circuit.

As shown in FIG. 2B, the bi-directional DC conversion unit 13 with the two-stage conversion structure has a first stage conversion circuit 131 and a second stage conversion circuit (i.e., a boost/buck circuit 132), that is, in comparison with FIG. 2A, the two-stage conversion structure further has the boost/buck circuit 132 as the second stage conversion circuit. The boost/buck circuit 132 is used to provide a step-up conversion or a step-down conversion. According to the requirements of actual applications, the bi-directional DC conversion unit 13 with the single-stage conversion structure or the bi-directional DC conversion unit 13 with the two-stage conversion structure may be selected. In particular, the bi-directional DC conversion unit 13 with the two-stage conversion structure can provide a wide range of conversion voltage to have a better dynamic voltage adjustment. For example, if the first side of the bi-directional DC conversion unit 13 is an input side and has a voltage of 1580 volts. For the bi-directional DC conversion unit 13 with the single-stage conversion structure, the second side thereof can output a voltage range of 800 to 1000 volts. However, for the bi-directional DC conversion unit 13 with the two-stage conversion structure, the second side thereof can output a voltage range of 200 to 1000 volts. Accordingly, the bi-directional DC conversion unit 13 with the two-stage conversion structure can provide the wider range of conversion voltage to have the better dynamic voltage adjustment.

Figure 3A:
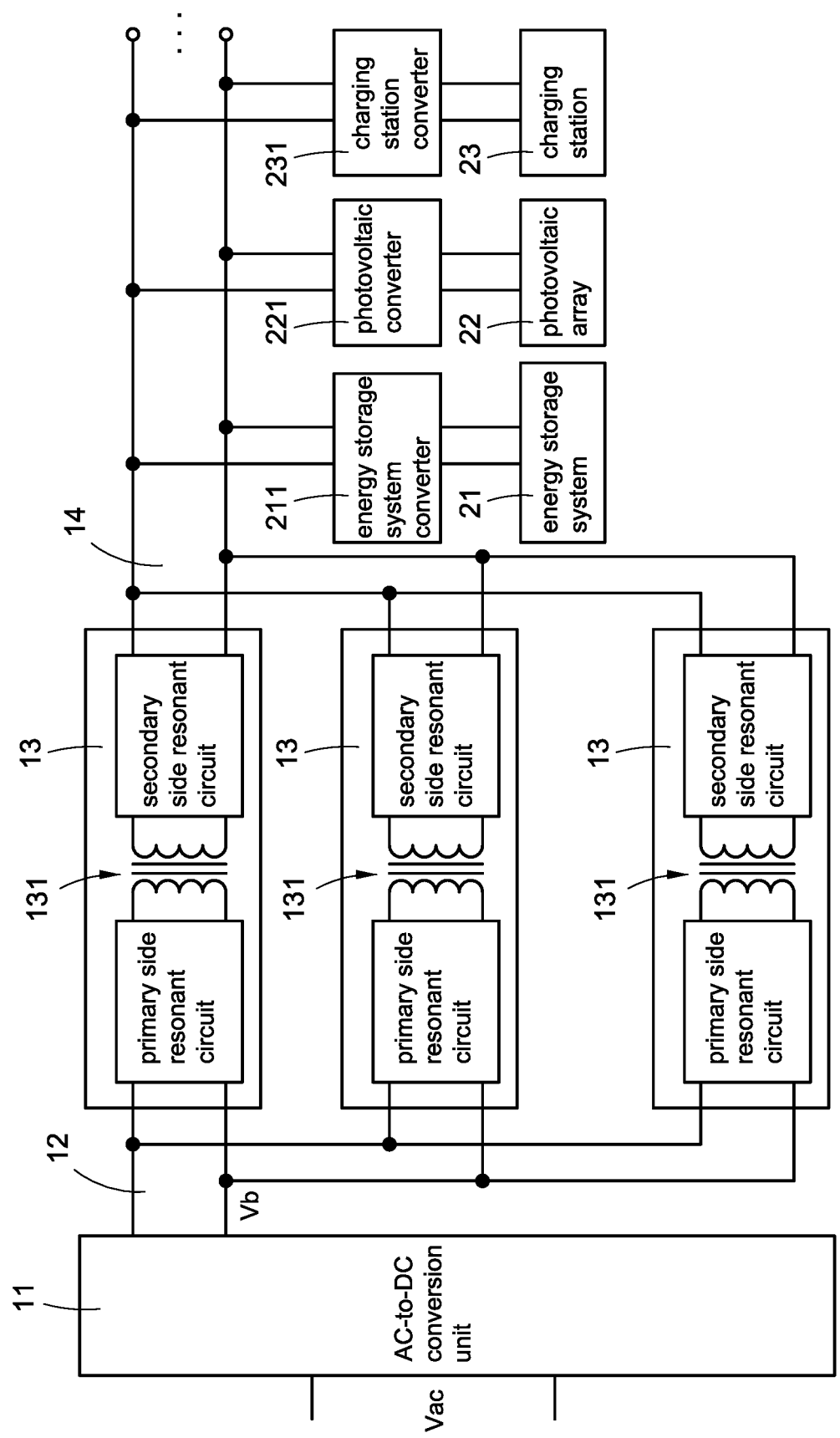
FIG. 3A is a circuit block diagram of the power apparatus applied to an external apparatus according to a first embodiment of the present disclosure.
Figure 3B:
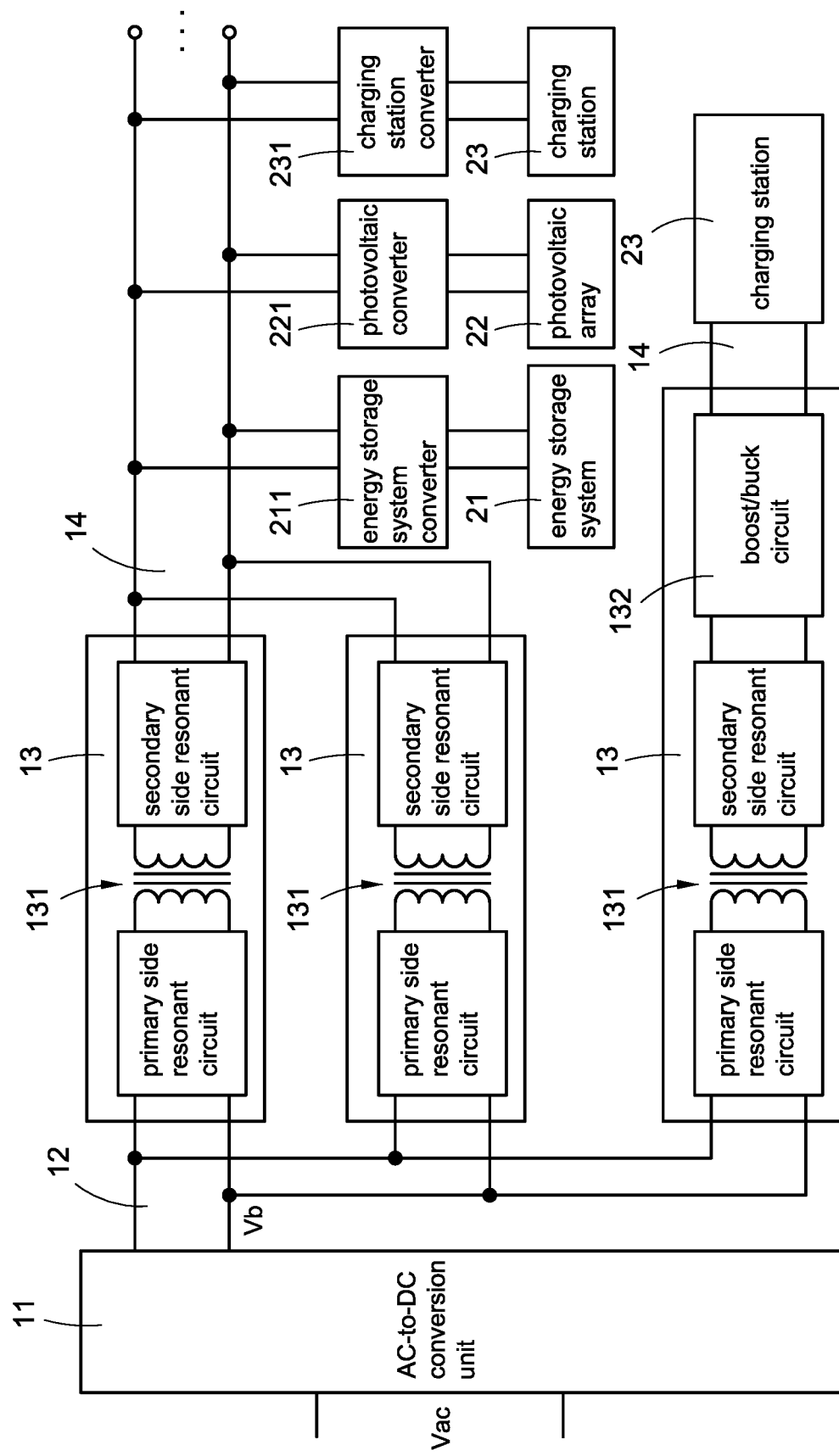
FIG. 3B is a circuit block diagram of the power apparatus applied to the external apparatus according to a second embodiment of the present disclosure.
Figure 3C:
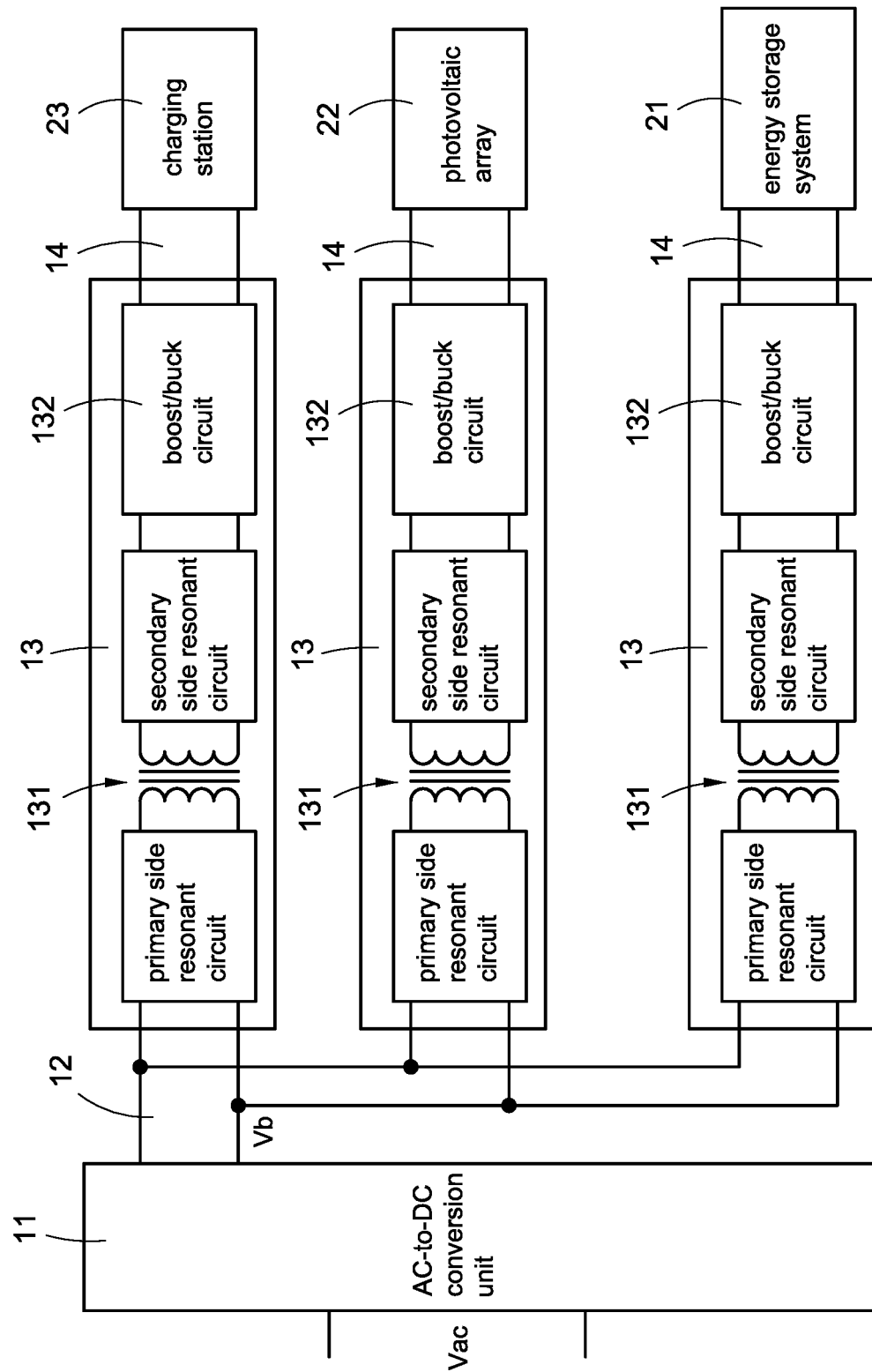
FIG. 3C is a circuit block diagram of the power apparatus applied to the external apparatus according to a third embodiment of the present disclosure.

Please refer to FIG. 3A to FIG. 3C, which show circuit block diagrams of the power apparatus applied to external apparatuses according to a first embodiment, a second embodiment, and a third embodiment of the present disclosure, respectively. Take three bi-directional DC conversion units 13 as an example. In FIG. 3A, the three second sides of the three bi-directional DC conversion units 13 are configured to form one second DC bus 14 (the bus number is equal to 1), and each of the bi-directional DC conversion units 13 has a single-stage conversion structure (i.e., only the first stage conversion circuit 131 is involved). The power apparatus is electrically coupled external apparatuses, such as an energy storage system (ESS) 21, a photovoltaic array 22, and a charging station 23. In addition, the type and number of external apparatuses electrically connected to the power apparatus are not limited as shown in FIG. 3A, that is, the power apparatus can be electrically connected to a plurality of the energy storage systems 21, the photovoltaic arrays 22, and the charging stations 23.

In the bi-directional DC conversion unit 13 with the single-stage conversion structure, for the energy storage system 21, an energy storage system converter 211, such as an ESS bi-directional charger may be used for power conversion from the second DC bus 14 to the energy storage system 21, or from the energy storage system 21 to the second DC bus 14. For the photovoltaic array 22, a photovoltaic converter 221, such as a PV converter with Maximum Power Point Tracking (MPPT) function may be used for power conversion from the photovoltaic array 22 to the second DC bus 14. For the charging station 23, a charging station converter 231, such as an isolated bidirectional charger may be used for power conversion from the second DC bus 14 to the charging station 23, or from the charging station 23 to the second DC bus 14. In the bi-directional DC conversion unit 13 with the single-stage conversion structure, therefore, the energy storage system converter 211 is equivalent to another stage of power converter for the energy storage system 21. The photovoltaic converter 221 is equivalent to another stage of power converter for the photovoltaic array 22. The charging station converter 231 is equivalent to another stage of power converter for the charging station 23. However, according to the requirements of actual applications, the structure of the second DC bus 14 whose bus number is equal to 1 is not limited to use the bi-directional DC conversion unit 13 with the single-stage conversion structure shown in FIG. 3A. That is, the bi-directional DC conversion unit 13 with the two-stage conversion structure can also be used for the external apparatuses depending on the requirements of the rear stage apparatuses or voltage range. The bi-directional DC conversion units 13 with power transfer function are used to achieve bi-directional power flow operations (for example, the power flow direction is from the bi-directional DC conversion units 13 to the external apparatuses through the second DC buses 14, or the power flow direction is from the external apparatuses to the bi-directional DC conversion units 13 through the second DC buses 14), thereby increasing the commonality and flexibility for applications of the external apparatuses.

In FIG. 3B, the three second sides of the three bi-directional DC conversion units 13 are configured to form two second DC buses 14 (the bus number is equal to 2). The first two second sides of the two bi-directional DC conversion units 13 are configured to form one second DC bus 14, and each of the bi-directional DC conversion units 13 has the single-stage conversion structure (i.e., only the first stage conversion circuit 131 is involved). The third second side of the bi-directional DC conversion unit 13 is configured to form the other second DC bus 14, and the bi-directional DC conversion unit 13 is the two-stage conversion structure (i.e., the first stage conversion circuit 131 and the second stage conversion circuit are involved). The application operations of the first two bi-directional DC conversion units 13 and the external apparatuses may be referred to FIG. 3A and the descriptions thereof, and details are not described herein again.

In the case of using the bi-directional DC conversion unit 13 with the two-stage conversion structure, for the charging station 23, the charging station converter 231 can be absent (shown in FIG. 3A), and it still can be achieved to meet the requirement of wide range of conversion voltage for the charging station 23 through the second-stage conversion by the boost/buck circuit 132. In addition, the type and number of external apparatuses electrically connected to the power apparatus are not limited as shown in FIG. 3B, that is, the power apparatus can be electrically connected to a plurality of the energy storage systems 21, the photovoltaic arrays 22, and the charging stations 23. According to the requirements of actual applications, the structure of the second DC bus 14 whose bus number is equal to 2 is not limited to use the bi-directional DC conversion unit 13 with the single-stage conversion structure shown in FIG. 3B. That is, the bi-directional DC conversion unit 13 with the two-stage conversion structure can also be used for the external apparatuses depending on the requirements of the rear stage apparatuses or voltage range.

In FIG. 3C, the three second sides of the three bi-directional DC conversion units 13 are configured to form three second DC buses 14 (the bus number is equal to 3), and each of the bi-directional DC conversion units 13 is the two-stage conversion structure (i.e., the first stage conversion circuit 131 and the second stage conversion circuit are involved). In the case of using the bi-directional DC conversion unit 13 with the two-stage conversion structure, for the charging station 23, the charging station converter 231 can be absent, for the photovoltaic array 22, the photovoltaic converter 221 can be absent, and for the energy storage system 21, the energy storage system converter 211 can be absent, and it still can be achieved to meet the requirement of wide range of conversion voltage for the charging station 23, for the photovoltaic array 22, and for the energy storage system 21 through the second-stage conversions by the boost/buck circuits 132.

For convenience, FIG. 3A to FIG. 3C are only exemplarily for explaining the connection relationship between the bi-directional DC conversion units 13 in a single power apparatus, the energy storage system 21, the photovoltaic array 22, and the charging station 23. However, the actual application may be realized by three-phase multi-group parallel structure, which will be described later. Hereinafter, the power management, supply and demand applications of the power apparatus, the energy storage system 21, the photovoltaic array 22, and the charging station 23 will be described by way of exemplary embodiments. The AC power source Vac will be taken as an example of the power grid, and the embodiments are merely for convenience of description of the present disclosure, and are not intended to limit the present disclosure.

First embodiment: It is assumed that the required power of the charging station 23 is 100 kW, and the upper limit of the power supply of the power grid (AC power source Vac) is 50 kW. Therefore, the insufficient power supplied to the charging station 23 can be supported through the communication and coordination between the photovoltaic array 22 and the energy storage system 21. For example, if the photovoltaic array 22 can provide 50 kW, then the energy storage system 21 does not need to provide energy. If the photovoltaic array 22 can provide 20 kW only, then the energy storage system 21 should be able to provide 30 kW at least (if the photovoltaic array 22 can provide 30 kW only, then the energy storage system 21 should provide 20 kW). Therefore, the power grid, the photovoltaic array 22, and the energy storage system 21 are enabled to provide sufficient required electrical energy to the charging station 23. In other words, such kind of power conditioning system (PCS) control manner can be implemented for managing and dispatching electrical energy, and improving power quality.

Second embodiment: In general, the power supply priority of the power grid, the photovoltaic array 22, and the energy storage system 21 is determined according to the power supply period and the electricity price (power generation cost). For example, during peak periods of power consumption (e.g., 10 am to 2 pm), since the power generation cost of the power grid is relatively high, the main power source of the charging station 23 can be provided by the energy storage system 21 and/or the photovoltaic array 22 as much as possible. At this condition, if there is still insufficient power for the charging station 23, the power grid would join to supply power to the charging station 23. Therefore, by reducing the peak power consumption and utilizing the Time of Use (TOU) rates, the power saving and the cost savings can be achieved. On the contrary, during off-peak periods of power consumption, since the power generation cost of the power grid is low, the main power source of the charging station 23 can be provided as much as possible through the power grid, and the power grid (and/or the photovoltaic array 22) can also charge the energy storage system 21 to its full capacity, thereby ready for providing backup or redundant power.

The power supply and demand applications of the present disclosure are not limited to the above two embodiments. Considering the power generation cost of the power grid, the variation of the power consumption of the charging station 23, the unstable power supply characteristics of the photovoltaic array 22, and the various remaining capacity of the energy storage system 21, power supply efficiency optimization of each apparatus (unit) can be achieved through the communication and coordination between the power apparatuses and the external apparatuses. Thereby it can also achieve more flexible power management and allocation, as well as provide the capability of adapting to various power supply and demand conditions.

Figure 4:
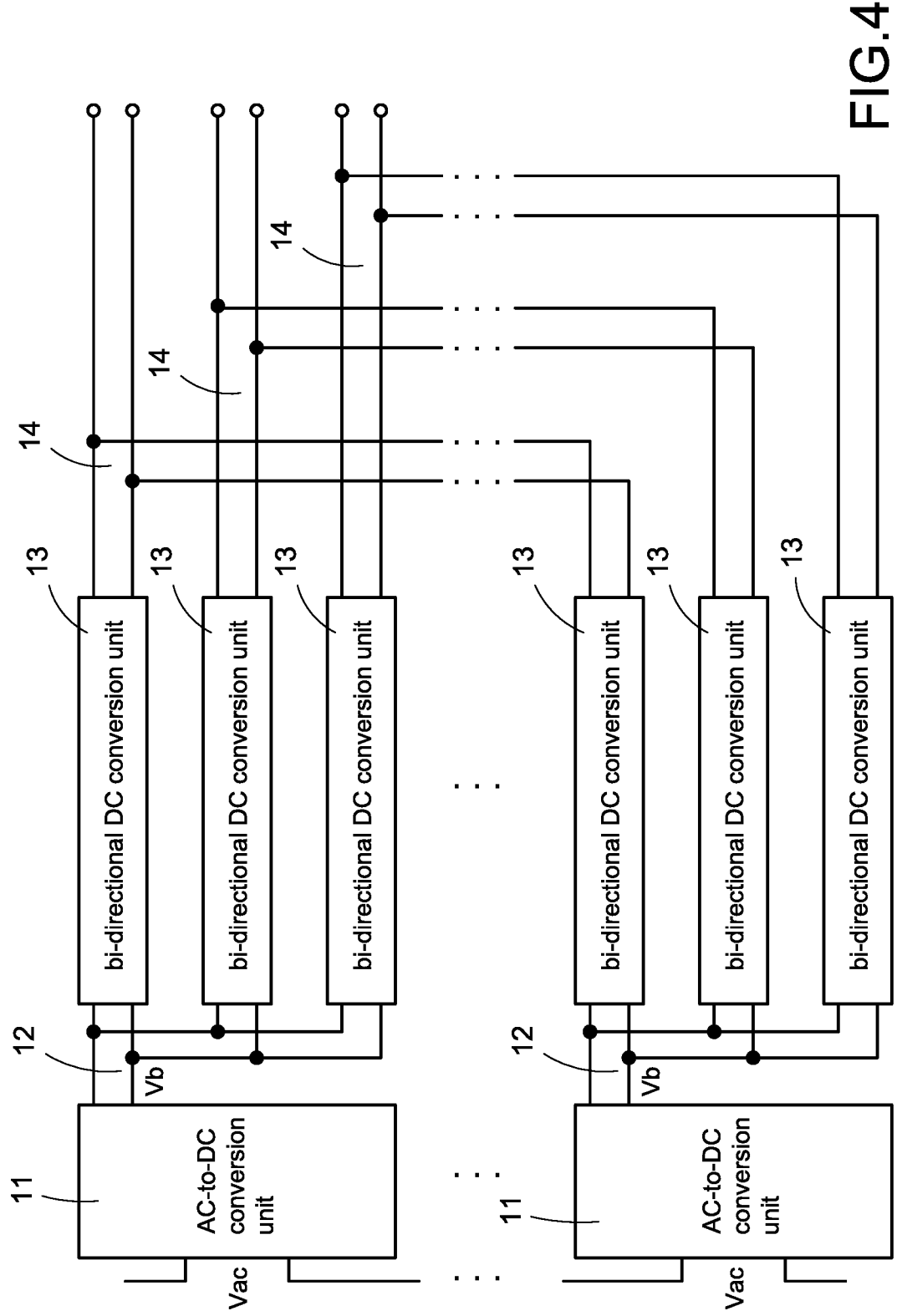
FIG. 4 is a circuit block diagram of the power apparatuses in the SST structure in one phase according to the present disclosure.
Figure 5:
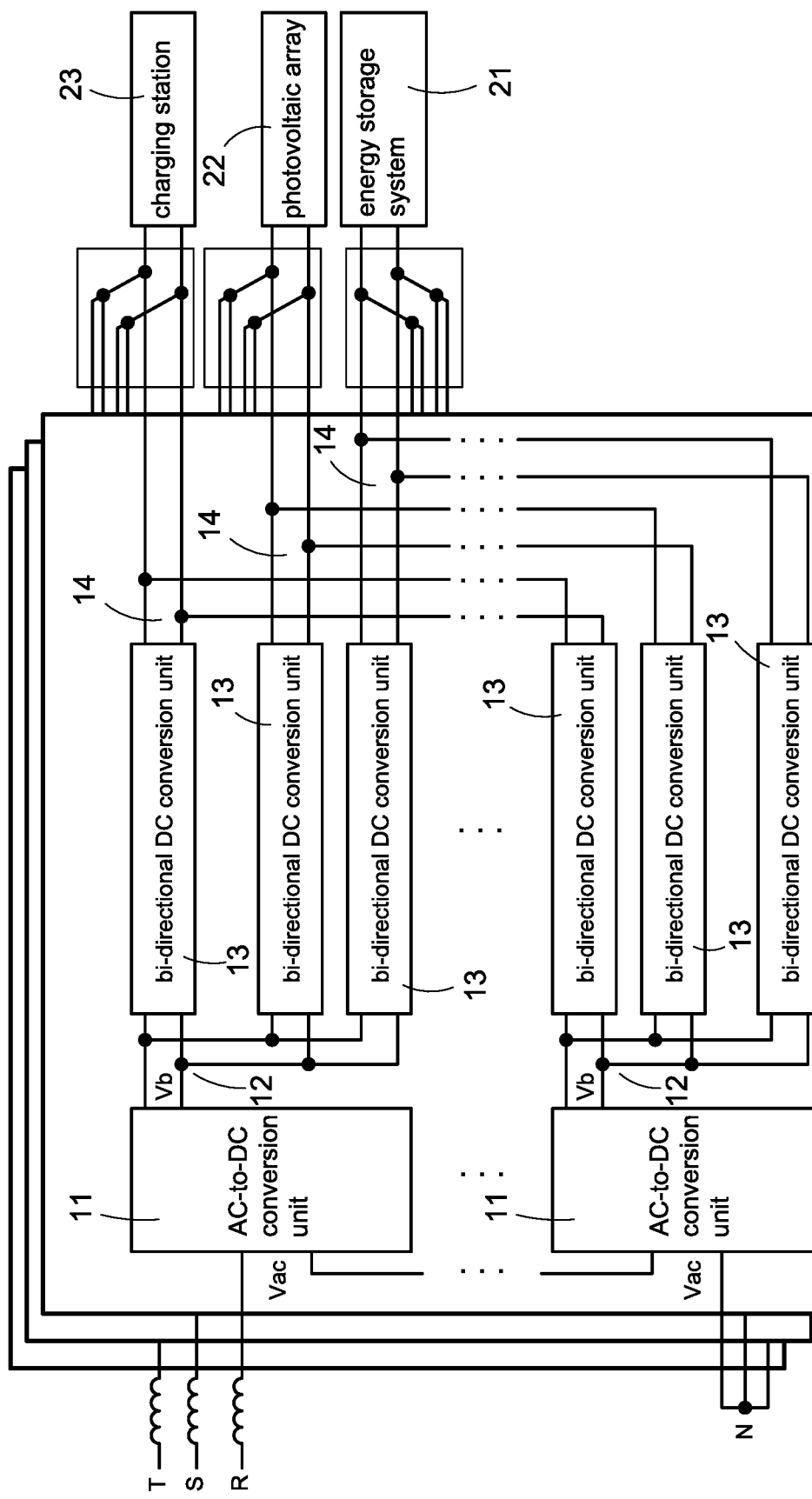
FIG. 5 is a circuit block diagram of the power apparatuses in the SST structure in three phases according to the present disclosure.

Please refer to FIG. 5, which shows a circuit block diagram of the power apparatuses in the SST structure in one phase of a three-phase AC power source according to the present disclosure. The schematic connection of the plurality of power apparatuses connected in one phase of the three-phase AC power source is shown in FIG. 4, and the configuration of each power apparatus is as shown in FIG. 1C, that is, the three second sides of the three bi-directional DC conversion units 13 are alone configured to form three second DC buses 14 (the bus number is equal to 3). However, FIG. 4 is only one embodiment of the present disclosure. In other words, the configuration of the single power apparatus shown in FIG. 1A (the bus number is equal to 1) or the configuration of the single power apparatus shown in FIG. 1B (the bus number is equal to 2) can also be used to form the structure of the plurality of the power apparatuses connected in one phase with multiple isolated DC power sources.

As shown in FIG. 4, the AC power source Vac sides of the AC-to-DC conversion units 11 are coupled in series, and the second sides of the bi-directional DC conversion units 13 are coupled in parallel. Specifically, the number of the power apparatuses in each phase is determined by a ratio of a system voltage of the three-phase AC power source to a withstand voltage of each power apparatus. For example, if a line voltage of the AC power source voltage is 13.2 kV (i.e., a phase voltage is 7.62 kV) and the withstand voltage of each apparatus is 0.847 kV, the number of the power apparatuses in each phase will be nine, as the ratio of the phase voltage 7.62 kV to the apparatus withstand voltage 0.847 kV. Therefore, the AC-to-DC conversion units 11 of the nine power apparatuses are coupled in series and the bi-directional DC conversion units 13 of the nine power apparatuses are coupled in parallel to commonly provide the DC volte to the corresponding second DC buses 14, or to commonly receive the DC voltage provided from the external apparatuses to the second DC buses 14.

Please refer to FIG. 5, which shows a circuit block diagram of the power apparatuses in the SST structure applied to three phases of a three-phase AC power source according to the present disclosure. The one phase structure shown in FIG. 4 can be combined into a three-phase multi-group structure. Specifically, the AC power source Vac sides of the AC-to-DC conversion units 11 are connected to each phase of the three-phase AC power source with a wye (Y) configuration with a neutral point N grounded, and each group of the power apparatuses can be coupled in parallel. Take the nine power apparatuses in one phase for example, by combining the power apparatuses in the three different phases, the first 27-group (9 groups in each of the R-phase, S-phase, and T-phase) bi-directional DC conversion units 13 are connected in parallel, the second 27-group bi-directional DC conversion units 13 are connected in parallel, and the third 27-group bi-directional DC conversion units 13 are connected in parallel, thereby achieving the voltage equalization and power balance. Take the charging station 23 for example, the required power of the charging station 23 can be supplied by the first 27-group bi-directional DC conversion units 13. In particular, the 27-group power apparatuses can, for example but not limited to, averagely or proportionally provide the required power to the charging station 23.

In addition, the AC-to-DC conversion units 11 coupled to one phase of the three-phase AC power source are controlled in an interleaved phase-shift manner. For example, if the number of the AC-to-DC conversion units 11 is three, and each of the AC-to-DC conversion units 11 is switching in 10 kHz with 120 degrees phase-shifted with each other, therefore a frequency (system frequency) of each phase can be enhanced to 30 kHz. Accordingly, each group of the AC-to-DC conversion units 11 can operate at a lower switching frequency, which can improve the power conversion efficiency, enabling better system total harmonic distortion (THD) characteristic so that smaller filter components can be used.

In conclusion, the present disclosure has following features and advantages:
1. The bi-directional DC conversion units with power transfer function are used to achieve bi-directional power flow operations, thereby increasing the commonality and flexibility for applications of the external apparatuses.
2. Either the bi-directional DC conversion unit with the single-stage conversion structure having better conversion efficiency, or the bi-directional DC conversion unit with the two-stage conversion structure having wider voltage conversion range for dynamic voltage adjustment can be used according to the actual application requirements.
3. Regarding the different voltage requirements and isolation requirements of charging stations, photovoltaic arrays, and energy storage systems, the power apparatuses with multiple groups of isolated DC power sources can meet those requirements and increase the flexibility of power supply and demand as well.
4. By coupling each group conversion units of the power apparatuses applied in the three-phase AC power source in parallel, voltage equalization and power balance can be achieved.
5. By controlling the AC-to-DC conversion units coupled to one phase of the three-phase AC power source in the interleaved phase-shift manner, each group of the AC-to-DC conversion unit can operate at a lower switching frequency, which can improve the power conversion efficiency, enabling better system total harmonic distortion (THD) characteristic so that smaller filter components can be used.

Although the present disclosure has been described with reference to the preferred embodiment thereof, it shall be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:
1. A power apparatus assembly, the power apparatus assembly comprising:
   a plurality n of power apparatuses, wherein n is a positive integer and is greater than 1, each of the plurality n of power apparatuses comprising:
   an AC-to-DC conversion unit, having a first side and a second side, wherein the first side of the AC-to-DC conversion unit is coupled to one phase of a three-phase AC power source,
   a first DC bus, coupled to the second side of the AC-to-DC conversion unit, and having a bus voltage,
   a plurality m of DC-to-DC conversion units, wherein m is a positive integer and is greater than 1, each of the plurality m of DC-to-DC conversion units having a first side and a second side, wherein the first sides of the plurality m of DC-to-DC conversion units are coupled to the first DC bus, and the plurality m of DC-to-DC conversion units are configured to receive the bus voltage and convert the bus voltage into a plurality m of DC voltages, and
   at least one second DC bus, coupled to the second sides of the plurality m of DC-to-DC conversion units, and configured to receive the plurality m of DC voltages, wherein a number of the at least one second DC bus is between 1 and m,
   wherein the plurality m of DC-to-DC conversion units of each power apparatus are individually connected to a separate corresponding AC-to-DC conversion unit in the power apparatus,
   wherein the plurality n of first sides of the AC-to-DC conversion units of the plurality n of power apparatuses are connected in series,
   wherein a number of the at least one second DC bus of the plurality m of DC-to-DC conversion units of the plurality n of power apparatuses are the same.

2. The power apparatus assembly in claim 1, wherein connection configurations of the at least one second DC bus of the plurality m of DC-to-DC conversion units of the plurality n of power apparatuses are correspondingly identical and parallel.

3. The power apparatus assembly in claim 1, wherein the plurality m of DC-to-DC conversion units is further configured to receive at least one external DC voltage from the at least one second DC bus, and convert the at least one external DC voltage into the bus voltage of the first DC bus, wherein a number of the at least one external DC voltage is between 1 and m.

4. The power apparatus assembly in claim 1, wherein the at least one second DC bus is coupled to at least one external apparatus.

5. The power apparatus assembly in claim 4, wherein the at least one external apparatus is capable of receiving power provided from the plurality m of DC-to-DC conversion units through the at least one second DC bus, or the at least one external apparatus is capable of providing power to the plurality m of DC-to-DC conversion units through the at least one second DC bus.

6. The power apparatus assembly in claim 5, wherein the at least one external apparatus is a charging station, a photovoltaic array, or an energy storage system.

7. The power apparatus assembly in claim 6, wherein the charging station is coupled to the at least one second DC bus through a charging station converter, the photovoltaic array is coupled to the at least one second DC bus through a photovoltaic converter, or the energy storage system is coupled to the at least one second DC bus through an energy storage system converter,
   wherein the charging station converter, the photovoltaic converter, or the energy storage system converter are configured to receive at least one DC voltage or provide at least one external DC voltage.

8. The power apparatus assembly in claim 4, wherein the at least one second DC bus is coupled to the at least one external apparatus through a converter.

9. The power apparatus assembly in claim 1, wherein when the plurality m of the second sides of the plurality m of DC-to-DC conversion units are configured together, the number of the at least one second DC bus is 1, or when the plurality m of the second sides of the plurality m of DC-to-DC conversion units are configured alone, the number of the at least one second DC bus is m.

10. The power apparatus assembly in claim 1, wherein each of the plurality m of DC-to-DC conversion units comprises:
   a first stage conversion circuit comprising:
      an isolated transformer having a primary side and a secondary side,
      a primary side resonant circuit coupled to the primary side, and a secondary side resonant circuit coupled to the secondary side.

11. The power apparatus assembly in claim 1, wherein each of the plurality m of DC-to-DC conversion units comprises:
a first stage conversion circuit comprising:
an isolated transformer having a primary side and a secondary side,
a primary side resonant circuit coupled to the primary side, and
a secondary side resonant circuit coupled to the secondary side, and
a second stage conversion circuit coupled to the secondary side resonant circuit, wherein the second stage conversion circuit is a boost or buck circuit.

12. A power system, the power system comprising three power apparatus assemblies, and each power apparatus assembly coupled to one phase of a three-phase AC power source, and the each power apparatus assembly comprising:
a plurality n of power apparatuses, wherein n is a positive integer and is greater than 1, each of the plurality n of power apparatuses comprising:
an AC-to-DC conversion unit, having a first side and a second side, wherein the plurality n of first sides of the AC-to-DC conversion units of the plurality n of power apparatuses are connected in series to receive the one phase of the three-phase AC power source,
a first DC bus, coupled to the second side of the AC-to-DC conversion unit, and having a bus voltage,
a plurality m of DC-to-DC conversion units, wherein m is a positive integer and is greater than 1, each of the plurality m of DC-to-DC conversion units having a first side and a second side, wherein the first sides of the plurality m of DC-to-DC conversion units are coupled to the first DC bus, and the plurality m of DC-to-DC conversion units are configured to receive the bus voltage and convert the bus voltage into a plurality m of DC voltages, and
at least one second DC bus, coupled to the second sides of the plurality m of DC-to-DC conversion units, and configured to receive the plurality m of DC voltages, wherein a number of the at least one second DC bus is between 1 and m,
wherein the plurality m of DC-to-DC conversion units of each power apparatus are individually connected to a separate corresponding AC-to-DC conversion unit in the power apparatus,
wherein a number of the at least one second DC bus of the plurality m of DC-to-DC conversion units of the plurality n of power apparatuses are the same,
wherein the at least one second DC bus of the plurality m of DC-to-DC conversion units of the plurality n of power apparatuses of the three power apparatus assemblies are correspondingly connected in parallel.

13. The power system in claim 12, wherein connection configurations of the at least one second DC bus of the plurality m of DC-to-DC conversion units of the plurality n of power apparatuses are correspondingly identical and parallel.

14. The power system in claim 13, wherein the at least one second DC bus of the plurality m of DC-to-DC conversion units of the plurality n of power apparatuses of the three power apparatus assemblies are coupled to at least one external apparatus.

15. The power system in claim 14, wherein the at least one external apparatus is capable of receiving power provided from the plurality m of DC-to-DC conversion units through the at least one second DC bus, or the at least one external apparatus is capable of providing power to the plurality m of DC-to-DC conversion units through the at least one second DC bus.

16. The power system in claim 12, wherein the plurality n of AC-to-DC conversion units coupled to one phase of the three-phase AC power source are controlled in an interleaved phase-shift manner.

17. The power system in claim 12, wherein a number of the power apparatuses coupled to one phase of the three-phase AC power source is determined by a ratio of a system voltage of the three-phase AC power source to a withstand voltage of the each power apparatus.

* * * * *